US012529287B1

(12) United States Patent
Chamarthy

(10) Patent No.: US 12,529,287 B1
(45) Date of Patent: Jan. 20, 2026

(54) SYSTEMS AND METHODS FOR SEPARATING AND STORING DOWNHOLE DEBRIS

(71) Applicant: Halliburton Energy Services, Inc., Houston, TX (US)

(72) Inventor: Pramod Chamarthy, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/786,295

(22) Filed: Jul. 26, 2024

(51) Int. Cl.
| | |
|---|---|
| E21B 37/00 | (2006.01) |
| B01D 29/11 | (2006.01) |
| B01D 29/52 | (2006.01) |
| B01D 29/58 | (2006.01) |
| B01D 29/90 | (2006.01) |
| E21B 21/00 | (2006.01) |
| E21B 27/00 | (2006.01) |
| E21B 27/04 | (2006.01) |
| E21B 43/38 | (2006.01) |

(52) U.S. Cl.
CPC ............ *E21B 37/00* (2013.01); *B01D 29/114* (2013.01); *B01D 29/52* (2013.01); *B01D 29/58* (2013.01); *B01D 29/902* (2013.01); *E21B 21/002* (2013.01); *E21B 27/005* (2013.01); *E21B 27/04* (2013.01); *E21B 43/38* (2013.01)

(58) Field of Classification Search
CPC ...... E21B 37/00; E21B 21/002; E21B 27/005; E21B 27/04; E21B 43/38; B01D 29/114; B01D 29/52; B01D 29/58; B01D 29/902
See application file for complete search history.

(56) References Cited

U.S. PATENT DOCUMENTS

| | | | |
|---|---|---|---|
| 5,851,389 A | 12/1998 | Brewster et al. | |
| 8,056,622 B2* | 11/2011 | Lynde | E21B 37/00 166/105.3 |
| 8,109,331 B2 | 2/2012 | Lynde | |
| 8,316,965 B2* | 11/2012 | Hallundbaek | E21B 27/005 175/102 |
| 9,284,818 B2* | 3/2016 | Hallundbæk | E21B 43/128 |
| 9,334,704 B2* | 5/2016 | Mineo | E21B 34/063 |

(Continued)

OTHER PUBLICATIONS

International Search Report and Written Opinion dated Apr. 16, 2025 for related PCT Application No. PCT/2024/052196 filed Oct. 21, 2024.

*Primary Examiner* — Neel Girish Patel
(74) *Attorney, Agent, or Firm* — K&L Gates LLP

(57) ABSTRACT

A debris separation and storage ("SAS") apparatus for removing debris from a wellbore, the SAS apparatus including a chamber that includes a housing and an inlet tube located within the housing. The inlet tube includes a plurality of exit apertures positioned along the length of the inlet tube and configured to allow flow of a debris slurry, within the wellbore, from the inlet tube into an SAS area outside of the inlet tube. The chamber also includes a plurality of filter tubes located within the SAS area and oriented parallel to and radially outward from the inlet tube. The filter tubes are configured to block debris larger than a predetermined size of debris from flowing into the filter tubes while allowing the remaining fluid from the debris slurry to pass through the plurality of filter tubes and then out of the chamber, thereby producing a processed debris slurry.

20 Claims, 8 Drawing Sheets

(56) References Cited

U.S. PATENT DOCUMENTS

| | | | |
|---|---|---|---|
| 9,890,605 B2 | 2/2018 | Juhlin et al. | |
| 10,030,485 B2* | 7/2018 | Gourmelon | E21B 43/38 |
| 10,072,472 B2 | 9/2018 | Jensen | |
| 10,605,064 B1* | 3/2020 | Raglin | B01D 33/275 |
| 2006/0037746 A1* | 2/2006 | Wright | E21B 43/35 |
| | | | 166/228 |
| 2006/0237197 A1 | 10/2006 | Dale et al. | |
| 2010/0258297 A1* | 10/2010 | Lynde | E21B 37/00 |
| | | | 166/105.1 |
| 2010/0258302 A1* | 10/2010 | Bonner | E21B 43/084 |
| | | | 166/244.1 |
| 2012/0061073 A1* | 3/2012 | Soni | E21B 27/00 |
| | | | 166/99 |
| 2014/0014320 A1 | 1/2014 | Soni et al. | |
| 2015/0321125 A1 | 11/2015 | Jenkins et al. | |
| 2015/0345276 A1* | 12/2015 | Jensen | E21B 27/00 |
| | | | 166/105.3 |
| 2016/0168939 A1* | 6/2016 | Harris | E21B 27/005 |
| | | | 166/250.01 |
| 2017/0107798 A1* | 4/2017 | Gourmelon | E21B 43/121 |
| 2017/0218735 A1 | 8/2017 | Mericas | |
| 2018/0266230 A1* | 9/2018 | Caballero | E21B 43/38 |
| 2019/0055802 A1* | 2/2019 | Haugland | E21B 11/04 |
| 2021/0324722 A1* | 10/2021 | Xiao | E21B 43/38 |
| 2023/0349251 A1* | 11/2023 | Madan | E21B 23/0412 |
| 2024/0344432 A1* | 10/2024 | Snyder | E21B 43/35 |

\* cited by examiner

SYSTEMS AND METHODS FOR SEPARATING AND STORING DOWNHOLE DEBRIS

BACKGROUND

Wellbores may be created through various drilling techniques to access hydrocarbons in downhole formations for production. Wellbores may be accessed by various tools during and after drilling. There are various types of downhole and wellbore tools including measurement-while-drilling ("MWD")/logging while drilling ("LWD") tools, bottomhole assemblies ("BHAs"), rotary steerable systems ("RSS"), downhole tractor and any other type of downhole conveyance technique tools, pumps, valves, and other types of downhole tools. Coiled tubing tools are run on coiled tubing, which may be truck or skid mounted and can be conveyed downhole to clean a wellbore of debris. In some instances, a crane can be integrated with the unit or mobilized as a separate piece of equipment when deploying coiled tubing tools.

In addition to coiled tubing, downhole tools can also be conveyed downhole on a wireline or slickline. Wireline includes braided line and electric line that can be used to deploy downhole tools as well as provide power and data communication down to the tool in the wellbore. Wireline run debris removal tools can remove a moderate amount of debris (which may be less than a coiled tubing tool), but typically cost much less than coil tubing service(s). With wireline run tools, screens are used to filter out the debris from the fluid mixture. As the thickness of the debris layer increases, the pressure required to maintain the flowrate increases as well, which in turn often makes the wireline tool less efficient as the more debris is picked up.

Slickline tools are run on slickline, which is also a braided line but does not have power or communication capabilities. Slickline can be truck or skid mounted and the wire is wrapped on a drum and a winch is used to run the wire in and out of the well. Slickline tools are typically cheaper to operate but are often only capable of removing small amounts of debris, which is typically less debris than coiled tubing tools and other wireline tools can remove.

When drilling the wellbore to produce hydrocarbons, or otherwise accessing the wellbore with downhole tools, debris often needs to be removed from the wellbore after and/or during the drilling operation. Debris may be in the form of sand, scale, grease, pipe dope, and other scrap metals, elastomers, and materials from the drilling fluid, drilled substrate, and/or drilling equipment. Debris removal or filtration often leads to filter cake forming on the debris filter of a debris removal tool. Once sufficiently clogged or caked, the debris removal tool may have to be removed from the wellbore, cleaned, or serviced and then re-deployed to continue further debris removal, which leads to additional downtime. As the filter cakes, the pressure within the device typically increases to maintain the same flow, which increases operational costs and, in some instances, increase risks of damage to the debris removal tool. Filter cake, especially excessive caking on a filter, can lead to downtime, increased pressure, and in some instances failure of the debris removal tool.

BRIEF DESCRIPTION OF THE DRAWINGS

Aspects of the disclosure are described with reference to the following figures. The same or sequentially similar numbers are used throughout the figures to reference like features and components. The features depicted in the figures are not necessarily shown to scale. Certain features may be shown exaggerated in scale or in somewhat schematic form, and some details of elements may not be shown in the interest of clarity and conciseness.

DETAILED DESCRIPTION

Figure 1:
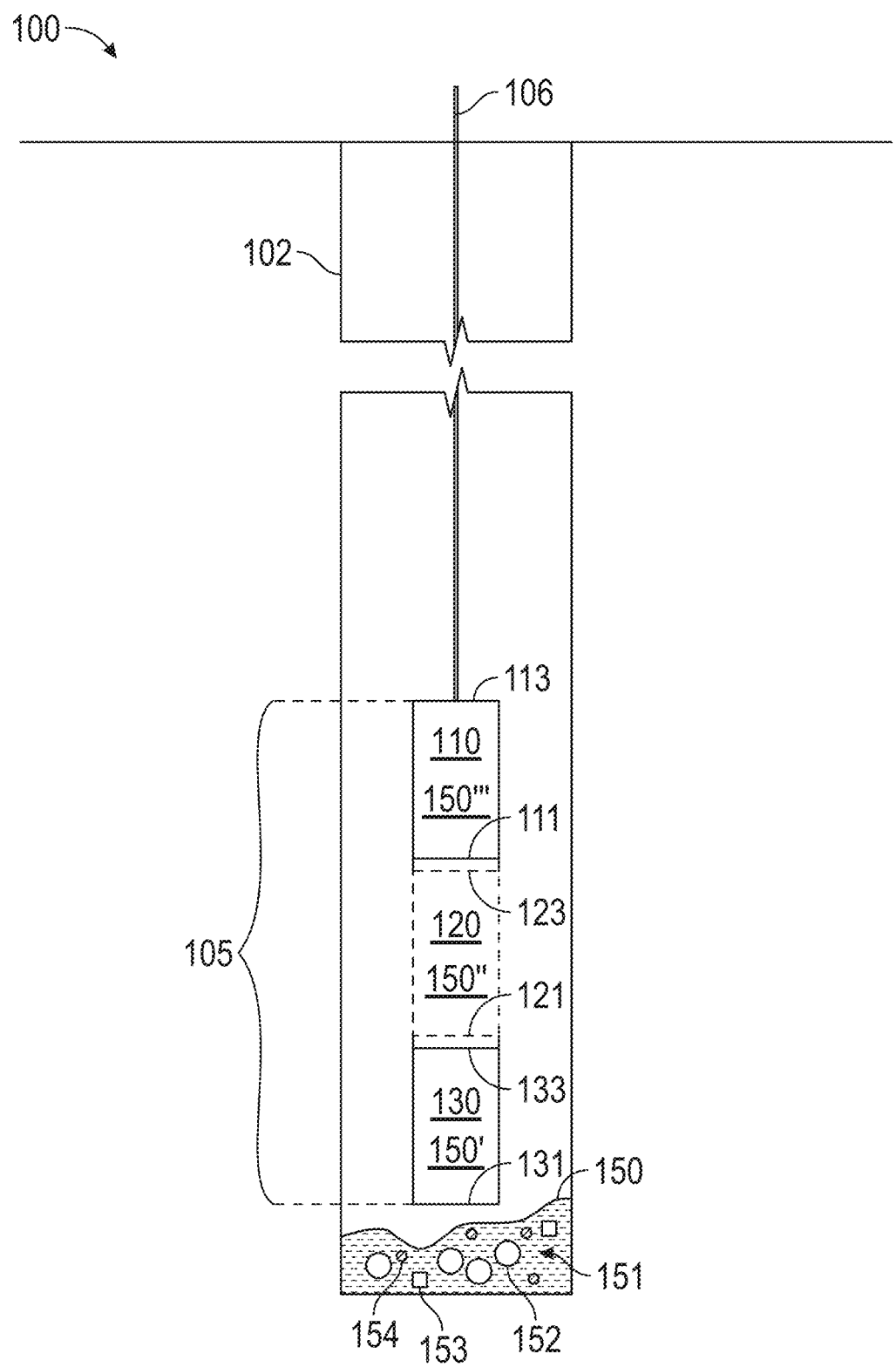
FIG. 1 is block diagram schematic view of a debris separation and storage ("SAS") apparatus for removing debris from a wellbore, according to an example of the present disclosure.

The present disclosure describes improved system(s), method(s), and apparatus(es) for separating and storing downhole debris from a wellbore. The described system(s), method(s), and apparatus(es) use centrifugal forces for the separation and storage of downhole debris. The wellbore may be created through various drilling techniques, which may create various types and sizes of debris within the wellbore. When drilling the wellbore to produce hydrocarbons, debris often needs to be removed from the wellbore after and/or during the drilling operation. Aside from the drilling, the debris may come from other sources outside of the drilling process. For example, debris may be in the form of sand, scale, grease, pipe dope, and other scrap metals, elastomers, and materials.

The contaminants or debris can adversely impact production rates in several ways. For example, sand grains in a fluid can be very abrasive to the tubing and valves. If the debris accumulates in safety valves, the valve may have degraded functionality or may become inoperable. Therefore, it is advantageous to remove (e.g., collect and store) as much of the debris as possible, especially the smallest debris, to prevent the adverse impacts debris has on the wellbore's production and productivity.

The present disclosure presents a novel chamber design that uses an axial flow filtration technique to filter out particulates and debris. The direction of the flow is parallel to the axis of the filters (e.g., screens), which helps minimize the thickness of the filter cake formed on the filters and in turn minimizes pressure increases upstream of the filters within the chamber as debris is collected. The proposed design may be further enhanced with a helical flighting or a spiral fluting to impart centrifugal forces on the fluid carrying debris (e.g., debris slurry) to be filtered. For example, helical flighting and/or spiral fluting may impart additional centrifugal forces on the debris slurry as it passes through an inlet tube to direct the debris slurry outwards towards various filter tubes positioned within the chamber. The centrifugal forces, imparted on the debris slurry by the helical flighting and/or spiral fluting, evenly distribute the debris slurry throughout the chamber and advantageously improve efficiency (e.g., capture efficiency) of the chamber. Furthermore, the even distribution of the debris slurry across the large filter surface of the filter tubes is further assisted by the axial flow of the processed debris slurry through the filter tubes before exiting the chamber.

The arrangement and geometry of the filter tubes provides a filter surface area that spans at least most of the length of the chamber. Additionally, the filtering direction (e.g., through the wall of the filter tubes) differs from the flow direction, which is axial or down the length of the filter tube, thereby allowing the flow to continue through the filter tubes even in portions of the filter tubes are blocked. Since the filtering surface extends along the axial flow path of the filter tubes, the axial flow of the processed slurry may advantageously proceed with minimal pressure buildup even if large portions of the filter tubes are blocked, which advantageously allows the filter tubes to remain operable for longer periods before caking. Since processed debris slurry is pulled from a filter surface extending along the length of the filter tubes, instead of being pulled or pushed through a single filter in the axial direction, the proposed design advantageously minimizes pressure buildup within the chamber during a debris removal operation (e.g., a debris collection and storage operation). Other techniques with single filters or axially aligned filter flow may cake faster due to the smaller filter surface area along with width of a chamber, making the filter inoperable thereby resulting in a faster pressure buildup and/or failure.

In an example, the novel chamber design includes a main chamber split into three regions. A first region includes a delivery tube positioned along a central axis of the chamber, the delivery tube including perforations or exit apertures positioned along the delivery tube. Multiple filter tubes are arranged around the central delivery tube. The filter tubes include perforated mesh or screens to separate or filter out debris from the debris slurry. Fluid carrying debris, or "debris slurry", enters the chamber through the delivery tube and exits the delivery tube through the perforations/exit apertures into the region between the delivery tube and the filter tubes. As the debris slurry passes over and into the filter tubes, the debris tube walls act as filters to separate and filter the debris from the debris slurry, thereby allowing the remaining fluid (free of debris) to flow into the filter tubes. The debris that is separated is then collected and stored within the chamber housing such that the debris can be removed from the wellbore with the removal of the chamber.

Turning now the figures, FIG. 1 is a block diagram schematic view of a debris separation and storage ("SAS") apparatus 105 for removing debris from a wellbore 102. In the illustrated example, the debris SAS apparatus 105 is used as part of a downhole system 100 run on a line or wire 106. In the example, the debris SAS apparatus is a tool run on a wireline (e.g., line or wire 106), but it should be appreciated that the examples disclosed herein may be used or may be modified for use with other downhole conveyance techniques, for example coiled tubing. For example, the downhole and wellbore tooling described herein may be implemented as coiled tube tooling, wireline tooling, slickline tooling, or via any other downhole conveyance technique. The debris SAS apparatus (105) is configured for removing various sizes and/or types of debris from the wellbore (102). In the illustrated example, the debris SAS apparatus 105 may include multiple chambers 110, 120, 130. Each chamber may be adapted for or configured to collect and store different types and/or sizes of debris. For example, chamber 130 may configured to separate and store large debris, while chamber 120 is configured to separate and store medium-sized debris and chamber 110 is configured to separate and store small debris. It should be appreciated however that more than one chamber may also collect and store the same types and/or sizes of debris.

In an example, a fluid 151 containing debris 152, 153, 154, which is referred to herein as a debris slurry 150, may travel through each chamber 130, 120, 110 of the debris SAS apparatus 105 sequentially. For example, the debris slurry 150 may enter chamber 130 through inlet 131 for processing to filter out large debris 152, thereby creating a processed debris slurry 150', before exiting chamber 130 through outlet 133. Then, the processed debris slurry 150' (containing only medium and small sized debris 153, 154 since the large debris 152 was filtered out, separated, and stored in chamber 130) may enter chamber 120 through inlet 121 for processing to filter out medium sized debris 153, thereby creating a further processed debris slurry 150", before exiting chamber 120 through outlet 123. Next, the further processed debris slurry 150" (containing only small sized debris 154, since the medium sized debris 153 was filtered out, separated, and stored in chamber 120) may enter chamber 110 through inlet 111 for processing to filter out medium-sized debris 153, thereby creating a finally processed debris slurry 150''', before exiting chamber 110 through outlet 113. The finally processed debris slurry 150''' is advantageously free of small, medium, and large sized debris, 154, 153, 152 each of which are separated and stored in chambers 110, 120 and 130, respectively.

Even though the example illustrated in FIG. 1 includes three chambers 130, 120, 110, it should be appreciated that a debris SAS apparatus 105 may include more or less chambers than illustrated in FIG. 1. Additionally, the debris SAS apparatus may include multiple chambers of the same type (e.g., two chambers 110 in series for small sized debris 154). The debris SAS apparatus 105 may typically include anywhere from one to eight chambers of varying combinations. In other examples, the debris SAS apparatus 105 may include more than eight chambers (e.g., up to twelve, fifteen or even more chambers). For example, the debris SAS apparatus 105 may include a plurality of chambers 130 for large sized debris, followed by a plurality of chambers 120 for medium sized debris, and finally a plurality of chambers 110 for small-sized debris. In other examples, there may be a single chamber 130 for large sized debris, multiple chambers 120 for medium sized debris, and a single chamber 110 for small sized debris. In other examples, each of the chambers may be for the same type and/or size of debris. The various chamber configurations for the debris SAS apparatus 105 may depend on environmental or wellbore conditions and may depend on the type and size of debris in the wellbore 102.

The debris slurry 150 may flow through the debris SAS apparatus according to a flow path extending from an inlet (e.g., inlet 131, 121, 11) of the first or "lead" chamber to and through an outlet (e.g., outlet 133, 123, 113) of the last or "ending" chamber used in combination or in series for the debris SAS apparatus 105. For example, the flow path may extend to and through multiple inlets and/or outlets along the flow path. In the example illustrated in FIG. 1, the flow path may extend from the inlet 131 of the first chamber 130, through the outlet 133 of the first chamber 130 to the inlet 121 of the second chamber 120, through the outlet 123 of the second chamber 120 to the inlet 111 of the third chamber 110 and ultimately through the outlet 113 of the third chamber 110.

Chamber 130 may be up to ten feet (3.05 meters) long. In some examples, chamber 130 is approximately three to six feet (0.91 meters to 1.83 meters) long and may be configured to separate and store (e.g., filter) debris that is approximately 0.75 inches to 0.25 inches (1.91 to 0.64 cm) in diameter, referred to herein as large debris or "large-sized" debris 152. Chamber 120 may be up to ten feet (3.05 meters) long. In some examples, chamber 120 is approximately three to six feet (0.91 meters to 1.83 meters) long and may be adapted for separating and storing (e.g., filtering) debris that is approximately 0.25 inches to 0.05 inches (0.64 to 0.13 cm) in diameter, referred to herein as medium debris or "medium-sized" debris 153. Chamber 110 may be up to ten feet (3.05 meters) long. In some examples, chamber 110 is approximately three to five six long (0.91 meters to 1.83 meters) and may be adapted for separating and storing (e.g., filtering) debris that is less than 0.25 inches (0.64 cm) in diameter including debris less than 0.05 inches (0.13 cm) in diameter, referred to herein as small debris or "small-sized" debris 154. Small-sized debris 154 may include debris particles that have a 0.002-inch (0.005 cm) to a 0.05-inch (0.13 cm) diameter or may include debris that is even smaller. The "small-sized" debris may include other types of debris like pipe dope, grease, etc. that chamber 130 is adapted for collecting and storing. It should be appreciated that these details are examples only and that other lengths and diameters may be appropriate.

Any of the chambers (e.g., chambers 130, 120, 110) described herein may include a chamber attachment area on at least one end of the chamber housing (e.g., housing 230 of chamber 110). In an example, the chamber attachment area is configured to receive and couple with a corresponding chamber attachment area of another chamber, which may be a chamber of the same type or a chamber of a different type, which advantageously allows for different filtering configurations by attaching different sequences of chambers together in series.

The debris SAS apparatus may include five or more, or even ten or more chambers. As discussed above, each chamber may be approximately three to six feet (0.91 meters to 1.83 meters) but may span up to ten feet (3.05 meters) in some examples. The debris SAS apparatus 105 may have a total length of 40 feet (12.19 meters) and above, with some examples ranging between 45 feet (13.72 meters) and 60 feet (18.29 meters). In other examples, the debris SAS apparatus 105 may be longer than 60 feet (18.29 meters), such as some configurations with up to fifteen chambers that span approximately 75 feet (22.86 meters). Some example configurations may include two to three chambers 130 for large debris 152, three to five chambers 120 for medium debris 153 and two to three chambers 110 for small debris 154.

In another example, the debris SAS apparatus 105 may include one or more chambers, such as a first chamber 130 and a second chamber (120, 110). The first chamber 130 may be configured to separate and store a first size of debris (e.g., large sized debris 152) from a debris slurry (150) within the wellbore to produce a first processed debris slurry 150'. For illustration, an embodiment is described without chamber 120, but instead with two chambers 130, 110 that are in fluid communication with each other. The second chamber 110 may be configured to separate and store a second size of debris (e.g., debris smaller than the large sized debris 152) from the first processed debris slurry 150' received from the first chamber 130. An example of chamber is illustrated in FIGS. 2A-2C and described in more detail below.

Figure 2A:
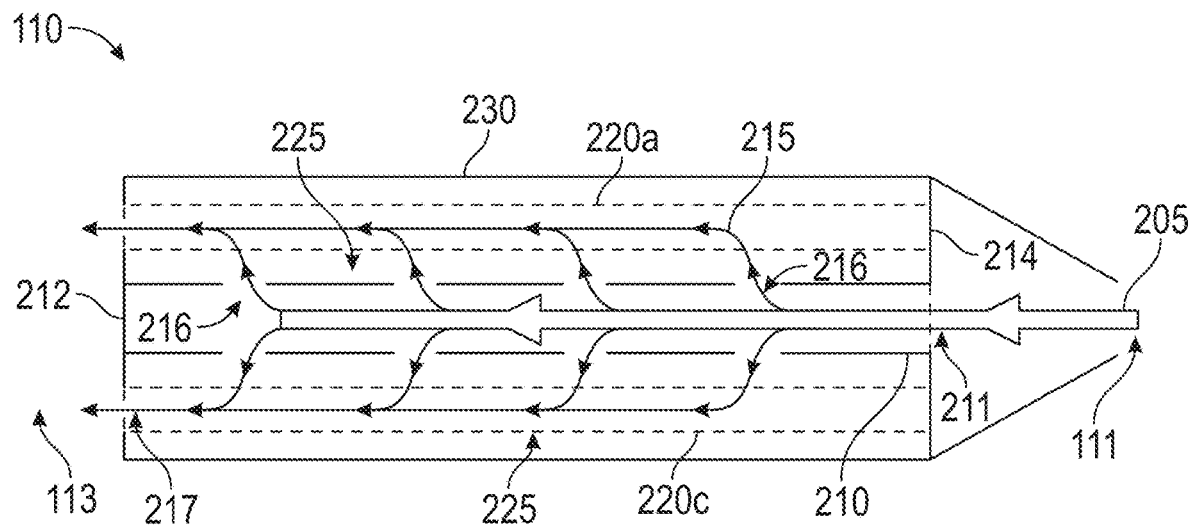
FIG. 2A is a schematic cross-sectional view of flow through a debris SAS chamber of a debris SAS apparatus, according to an example of the present disclosure.
Figure 2B:
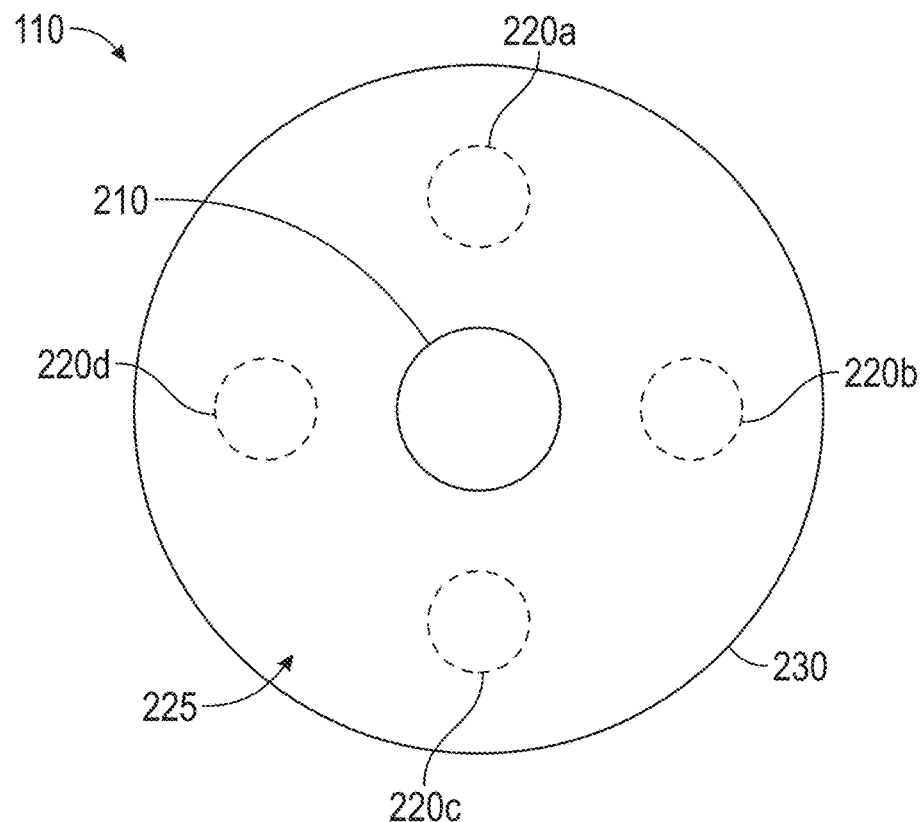
FIG. 2B is a schematic cross-sectional view illustrating filter tubes orientation within the debris SAS chamber of FIG. 2A, according to an example of the present disclosure.
Figure 2C:
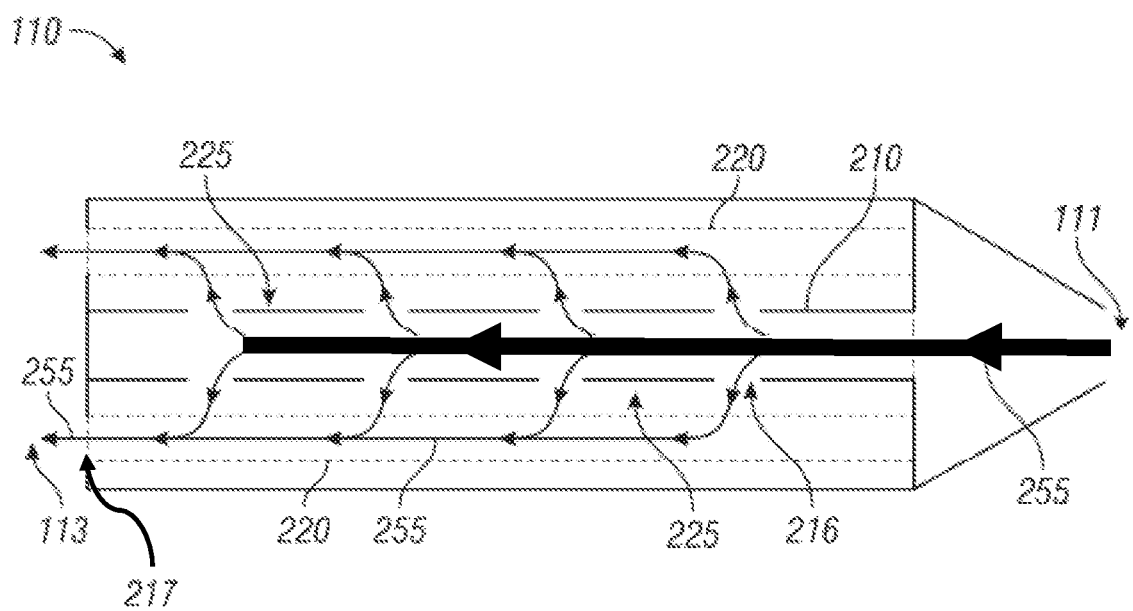
FIG. 2C is a schematic cross-sectional view of a flow path through the debris SAS chamber of FIG. 2A, according to an example of the present disclosure.

Turning now to FIGS. 2A-2C, a chamber, such as the second chamber 110 described above, may be referred to herein as a debris SAS chamber 110. An example debris SAS chamber 110 is illustrated in FIG. 2A, which illustrates a schematic cross-sectional view of flow through a debris SAS chamber 110. Other examples of a debris SAS chamber 110 are illustrated in FIGS. 2B and 2C. In an example, the debris SAS chamber 110 includes a housing 230 and an inlet tube 210 located within the housing 230. The debris SAS chamber 110 also includes one or more filter tubes 220 located within the housing and placed outside of the inlet tube 210. The inlet tube 210 includes a plurality of exit apertures 216 positioned along the length of the inlet tube 210, which are configured to allow flow of a debris slurry 150 or a processed debris slurry 150', 150" (depending on whether the debris SAS chamber 110 is positioned downstream of one or more other debris SAS chambers) from the inlet tube into an SAS area 225 before flowing through the one or more filter tubes 220.

The SAS area 225 is the area external to or outside of the inlet tube 210 and within the housing 230. For example, the space within the housing 230, unoccupied by the inlet tube 210, forms the SAS area 225. The filter tube(s) 220 occupy the SAS area 225. In an example, the SAS chamber 110 includes a plurality of filter tubes 220 located within the SAS area 225 and oriented parallel to and radially outward from the inlet tube 210. The filter tubes 220 include perforated mesh or screens with apertures sized and positioned to block debris (e.g., debris 152, 153, 154) from flowing into the filter tubes 220 while allowing the remaining fluid from the debris slurry 150 to pass through the plurality of filter tubes 220 and then out of the second chamber 110, thereby producing a processed debris slurry 150'.

For illustration purposes, the raw, dirty, or untreated debris slurry 150 is illustrated as arrow 205 or "untreated slurry" 205 in FIG. 2A. The untreated slurry 205 enters through inlet 111 into the inlet side (e.g., inlet 211) of inlet tube 210. The untreated slurry 205 travels down the inlet tube 210 to the tube's capped end 212. As the untreated slurry 205 travels towards the capped end 212, the slurry exits the inlet tube 210 at various axial locations through exit apertures 216 spaced along the length of the inlet tube 210. By spacing the apertures 216 along the length of the inlet tube 210 and positioning the inlet tube 210 along the central axis of the chamber 110, the untreated slurry 205 is evenly distributed within the SAS area 225 and across the filter tubes 220. The even distribution reduces buildup or caking of the filter tubes 220, which maintains proper flow and functionality of the SAS chamber 110. The untreated slurry 205 enters the SAS area 225 and is filtered via one or more filter tubes 220 (e.g., filter tube 220a and filter tube 220c) positioned within the SAS area. The filter tubes 220 have a capped end 214 and an open end near outlet 113 thereby allowing for axial flow of fluid along, down, and through the filter tubes 220 to outlet 113.

It should be appreciated that in examples where multiple SAS chambers (e.g., SAS chamber(s) 110) are connected in series, modifications or additions may be made to ensure proper flow of processed (e.g., filtered) and unprocessed (e.g., non-filtered) debris slurry throughout the system. For example, the filter tubes 220 and/or inlet tube 210 of SAS chamber 110 may be open on one or both ends (e.g., examples not including a capped end 212 and/or capped end 214) such that the debris slurry can flow from one SAS chamber 110 to the next SAS chamber 110 for additional processing. For example, with multiple SAS chambers 110 connected in series, the inlet tube 210 from each SAS chamber 110 may be in fluid communication with each other and the filter tubes 220 of one SAS chamber 110 may be in fluid communication with the filter tubes 220 of another SAS chamber 110. In an example with three SAS chambers 110 connected in series, the SAS chamber 110 that is furthest downstream may include capped end 214, while the end 212 remains open to allow slurry to flow to the next SAS chamber 110 (e.g., middle SAS chamber). The middle SAS chamber 110 may not have capped ends 214 or capped end 212 to allow flow from the first chamber to the middle chamber. The third SAS chamber 110, which is the furthest upstream of the three chambers, may include capped end 212 while ends 214 remain open to allow flow through the filter tubes 220 between SAS chambers 110.

As the untreated slurry 205 passes through the exit apertures 216, and may travel radially outward towards the filter tubes 220 (e.g., due to imparted centrifugal forces, described in more detail below), where debris (e.g., small-sized debris 154) is blocked and prevented from flowing through the filter tubes, thereby allowing the remaining fluid 151 to flow through the filter tubes, axially, along the length of the tube towards outlet portion 217. The remaining fluid 151 is illustrated as arrow 215 or "filtered slurry" 215, which is free of any debris that is small-sized and larger. The filtered slurry 215 travels axially down the filter tubes 220 toward outlet 113, for example, the filtered slurry 215 travels in the same direction as the unfiltered slurry 205 initially travels. The axial flow of the filtered slurry 215 advantageously is pulled from along the length of the filter tubes 220, thereby filtering and processing slurry along the entire length of the filter tubes 220. The evenly distributed flow across the filter tubes 220 (and also within the SAS area 225) is also attributed to the placement and arrangement of the exit apertures 216 spaced along the inlet tube 210. The axial and even distributed flow reduces excessive debris build up on the filter tubes 220, thereby reducing filter cake or filter caking, and advantageously reduces pressure buildup within the chamber during a debris separating and storing operation.

FIG. 2B illustrates an example orientation of the filter tubes 220 (e.g., filter tubes 220a, 220b, 220c and 220d) positioned within SAS area 225 and spaced about inlet tube 210. More or less filter tubes 220 may be implemented, with different size(s), shape(s), and geometry, some examples of which are described in more detail below in relation to FIGS. 4A-4D.

Depending on the position of a debris SAS chamber, such as chamber 110, within a debris SAS apparatus, the debris SAS chamber 110 may process raw debris slurry 150, which is debris slurry straight from the wellbore prior to any other processing. If the debris SAS chamber 110 is the second chamber in a series of chambers, then the debris SAS chamber processes a first processed debris slurry 150' received from the upstream or first chamber. Whereas is the debris SAS chamber is the third chamber in a series of chambers, as illustrated in FIG. 1, then the debris SAS chamber processes a second processed debris slurry 150". As used herein, the apostrophe (') indicates each time the debris slurry is processed. Furthermore, processing or processed may refer to filtering, collecting, or otherwise separating debris from the fluid portion of the debris slurry.

FIG. 2C illustrates a schematic view of the flow path 255. The flow path 255 begins at inlet 111 and travels through an open end of inlet tube 210. When the debris slurry 150 travels through the inlet tube 210, a swirling motion and/or centrifugal forces may be applied to the debris slurry 150 through a helical flighting that extends along the inside of the inlet tube 210 (see FIGS. 5A and 5B), a helical arrangement of exit apertures 216 (see FIG. 3C), or a combination thereof. The helical flighting may be one or more components and pieces and may include blades, protrusions, flights, fins, or the like arranged in a helical pattern along the inside of the inlet tube 210, such as along an inner surface or inner wall of the inlet tube 210, that are configured to impart centrifugal forces on the debris slurry 150.

As noted above, the centrifugal forces urge the debris slurry outward into the SAS area 225, such that the debris slurry 150 travels around, into, and through filter tubes 220. In an example, the debris slurry 150 may travel through the filter screens or filter mesh of the tubes before entering the interior of the filter tube(s) and travelling axially down the filter tube(s), which is referred to herein as "axial flow". This axial flow filtration technique to filter out particulates and debris has several advantages. For example, since the direction of the flow from inlet 111 to outlet 113 (e.g., from capped end 214 of FIG. 2A to outlet portion 217) is parallel to the planar surface of the filter, mesh, or screen, the parallel flow direction helps minimize the thickness of the filter cake in a specific area, which in turn minimizes the increase in pressure as debris is collected. The swirling nature and flow direction of the debris slurry 150 around and across the filter tubes 220 may advantageously provide self-cleaning qualities as new debris slurry flows around the filter tube and breaks apart or unclogs portions of the filter tube 220. The flow characteristics within the chamber 110 may provide enough self-cleaning that the formation of filter cake is mostly or entirely prevented under certain operating conditions.

Furthermore, since the debris slurry 150 is being filtered or processed along the length of the filter tubes 220, the processed debris slurry is pushed and/or pulled through the filter tube across a larger surface area than other axial direction filtering techniques, and thus the axial flow is maintained for the filter tube even if large portions of the filter tube had caking. By maintaining flow, operation may be maintained with no or limited increases in pressure. Therefore, the axial flow of the debris slurry through the chamber advantageously minimizes pressure buildup within the chamber during a debris removal operation (e.g., a debris collection and storage operation), which reduces energy consumption, reduces costs, improves efficiency, and improves safety.

Referring back briefly to FIG. 1, if the debris SAS chamber 110 is positioned third in series behind chamber 120, which is behind chamber 130, debris slurry 150 may flow through the debris SAS apparatus according to a flow path extending from the inlet 131 of the first chamber 130, through the outlet 133 of the first chamber 130 to the inlet 121 of the second chamber 120, through the outlet 123 of the second chamber 120 to the inlet 111 of the third chamber 110, through the inlet tube 210 and axially outward from the plurality of exit apertures 216 to the SAS area 225, through the plurality of filter tubes 220 positioned axially about the inlet tube, to their respective outlet portions 217 and to the outlet 113 of the third chamber 110.

Figure 3A:
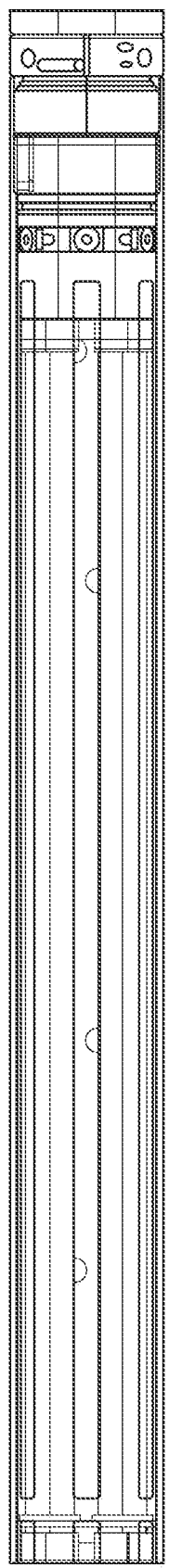
FIG. 3A is a top view of a debris SAS chamber, according to an example of the present disclosure.
Figure 3B:
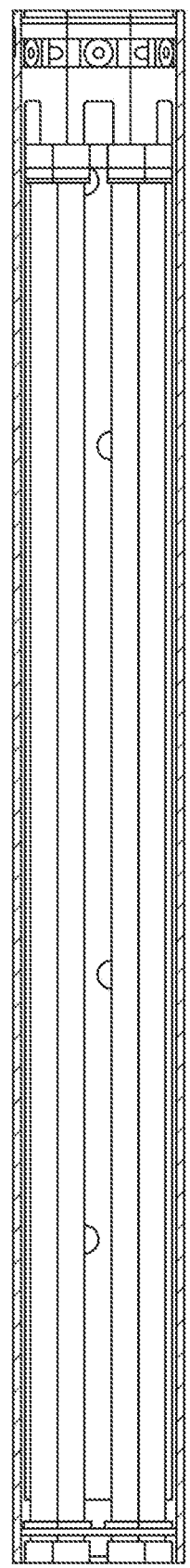
FIG. 3B is a top partial view of the debris SAS chamber of FIG. 3A with portions of the outer housing hidden, according to an example of the present disclosure.
Figure 3C:
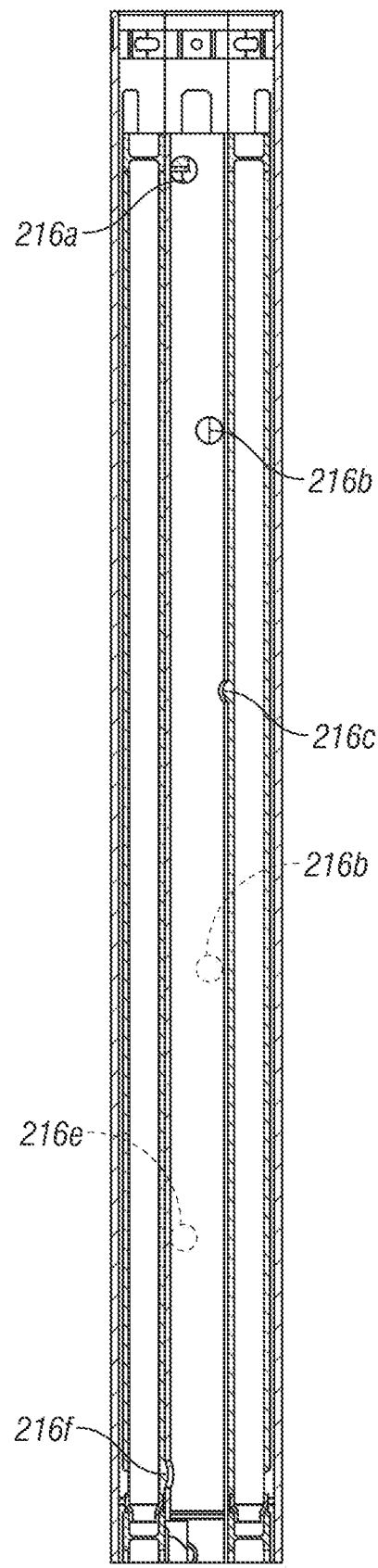
FIG. 3C is a top partial view of the debris SAS chamber of FIG. 3A with portions of the outer housing and portions of the filter tubes hidden, according to an example of the present disclosure.

Turning now to FIGS. 3A-3C, FIG. 3A is a top view of the debris SAS chamber 110. FIG. 3B is a top partial view of the debris SAS chamber 110 with portions of the outer cover or housing 230 hidden. FIG. 3C is a top partial view of the debris SAS chamber 110 with portions of the outer cover or housing 230 hidden and portions of the filter tubes 220 hidden, thereby exposing the top portion of the inlet tube 210. In other words, the debris SAS chamber is first shown in FIG. 3A with the outer housing 230 enclosing the filter tubes 220 and inlet tube 210. FIG. 3B shows the debris SAS chamber 110 with the housing 230 hidden, thereby revealing the layout of the filter tubes 220 around the inlet tube 210.

As best illustrated in FIG. 3C, the exit apertures 216 may be arranged in a helical pattern or helical configuration along the inlet tube 210. Looking down the inlet tube 210, each exit aperture 216 may offset the previous aperture by a predetermined angle or distance. For example, assuming the exit apertures lie on a circle (e.g., the outside of inlet tube 210) where the central axis in an X-Y plane of the inlet tube is the center of the circle, then if exit aperture 216a is at the Y-axis (e.g., 90 degrees from horizontal or X-axis), exit aperture may be at 30 degrees from aperture 216a (e.g., at 30 degrees from the Y-axis or 60 degrees from horizontal or X-axis). Then proceeding further along the inlet tube 210, exit aperture 216c may be another 30 degrees from aperture 216b, which would position aperture 216c at 60 degrees from the Y-axis or 30 degrees from the X-axis, assuming the exit apertures 216 are progressing in a clockwise or counterclockwise direction. The other apertures 216d, 216e and 216f may be spaced in a similar fashion as the exit apertures 216 progress down the inlet tube 210.

A helical configuration may enhance strength and structural integrity of the inlet tube 210 by reducing the occurrence of exit apertures existing along the same length of tube wall, the inlet tube 210 maintains strength and other mechanical properties over some other exit aperture configurations. For example, if all the exit aperture 216 are on the same side of the inlet tube 210, that side of the inlet tube 210 will be weaker from the reduction of material along that side). The helical configuration may also assist with creating a swirling motion of the debris slurry 150 (or a processed debris slurry) within the chamber, such that the debris slurry 150 (e.g., first processed debris slurry 150') travels radially outward along the length of the chamber. The helical configuration distributes the debris slurry 150 (e.g., the first processed debris slurry 150') along the length of the inlet tube 210 and at different axial positions and different angular orientations, thereby causing the debris slurry 150 to swirl within the chamber. Positioning the exit apertures 216 at different axial locations along the length of the inlet tube 210 and at different angular orientations advantageously distributes the debris slurry 150 evenly within the SAS area 225. Any additionally swirling caused by the helical configuration of the exit apertures 216 further mixes and evenly distributes the debris slurry 150 with the SAS area 225.

Other angles may be used other than those illustrated or described herein. For example, in the example illustrated in FIG. 3C, exit apertures 216 are spaced apart by an angle of approximately 40 to 50 degrees, such that the third exit aperture 216c is almost invisible and exit apertures 216d, 216e are hidden on the opposite side of the inlet tube 210. Exit aperture 216f is nearly visible to conclude the illustrated pattern of exist apertures 216. In one or more other examples, multiple passes of exit apertures 216 and/or other exit aperture patterns may be used (e.g., a dual-helix pattern) to alter or adjust the flow characteristics of the inlet tube 210.

Figure 4A:
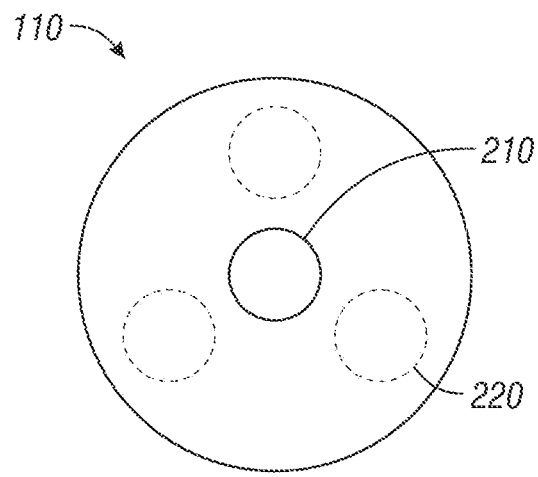
FIG. 4A is a block diagram cross-sectional schematic view of a filter tube and inlet tube layout within a debris SAS chamber, according to an example of the present disclosure.
Figure 4B:
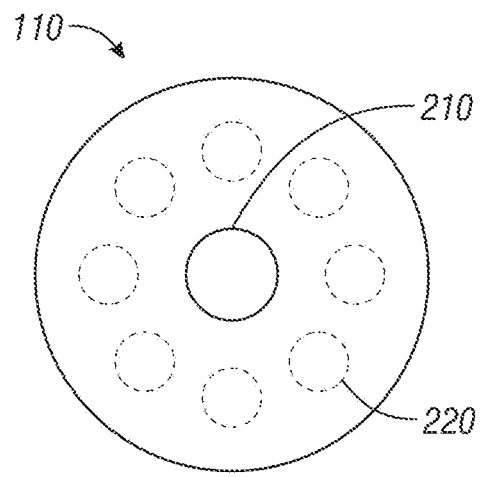
FIG. 4B is a block diagram cross-sectional schematic view of a filter tube and inlet tube layout within a debris SAS chamber, according to an example of the present disclosure.

Turning now to FIGS. 4A and 4B, which are block diagram schematic views of a cross-sectional view (looking down the inlet tube 210) of filter tube 220 and inlet tube 210 layout within a debris SAS chamber 110. In the examples illustrated in FIGS. 4A and 4B, filter tubes 220 may be circular, cylindrical tubes having a circular cross-section. In the example illustrated in FIG. 4C, the filter tubes 220 may have an oval or elliptical cross-section. The various examples illustrated in FIG. 4D show that the filter tubes 220 may be many different shapes, sizes, and geometries with both rounded and/straight sides.

The examples illustrated in FIGS. 4A-4D also show configurations with three filter tubes 220 up to eight filter tubes 220. It should be appreciated that a debris SAS chamber 110 may include a single filter tube 220. In another example, a debris SAS chamber 110 may include only two filter tubes 220. In other examples, a debris SAS chamber 110 may include more than two filter tubes 220. In some examples, a debris SAS chamber 110 may include more than the eight filter tubes 220 illustrated in FIG. 4B. It should be appreciated that filter tubes 220 may be cartridges, inserts, or boxes or have geometries that differ from tube-like or pipe-like geometries.

Figure 4C:
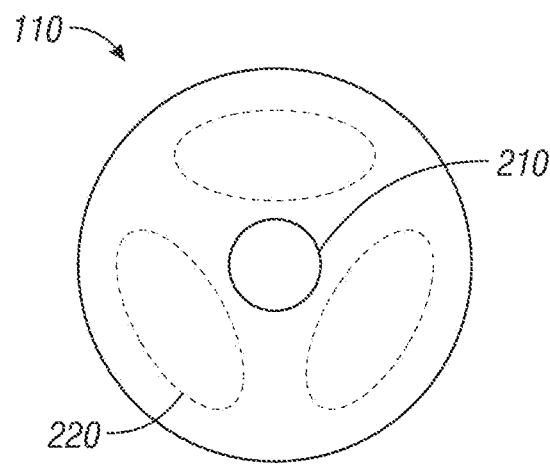
FIG. 4C is a block diagram cross-sectional schematic view of a filter tube and inlet tube layout within a debris SAS chamber, according to an example of the present disclosure.
Figure 4D:
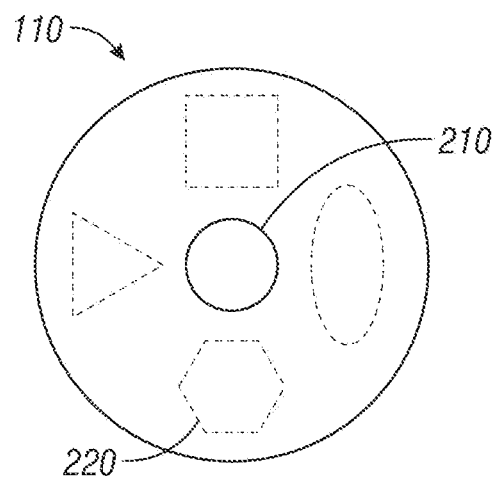
FIG. 4D is a block diagram cross-sectional schematic view of various filter tube geometries, according to one or more examples of the present disclosure.

In an example, the combined cross-sectional area of the plurality of filter tubes 220 is greater than a cross-sectional area of the inlet tube 210, as shown in each of the examples illustrated in FIGS. 4A-4C. In other examples, the cross-sectional area of the plurality of filter tubes 220 may be equal to the cross-sectional area of the inlet tube 210. In one or more other examples, the cross-sectional area of the plurality of filter tubes 220 may be less than the cross-sectional area of the inlet tube 210. In an example, the flow rates and sizing of the inlet tube 210, exit apertures 216, filter tubes 220 and filter screen/mesh size may factor into determining the cross-sectional area of the filter tubes 220 as well as other filter tube geometric considerations. Filter tube geometry may also depend on the size and characteristics of the debris.

The filter tubes 220 may be made from or formed from screens, mesh (e.g., wire mesh), porous material, slotted material (e.g., slotted filter), or any other material configured to block or restrict the flow of debris. In an example, the filter tubes 220 may have designated sections that includes the screens, mesh, slots, or the like. In another example, the majority of or the entire outer structure of the filter tubes 220 may be made from the screen, mesh, or slotted material. For example, the filter tubes may be formed from wire wrapped mesh or slotted screens. The filter tubes 220 may include a single layer of filtering media, such as a single layer screen with holes or slots sized and shaped to restrict or block flow of a certain size of debris. In another example, the filter tubes 220 may include multiple layers of filtering media, such as multiple layers of screens or slotted material. Each layer of filtering media may have a different slot or mesh size such that the filter tube 220 works as a multi-stage filter with the largest debris being collected at the outside screen/filter and successively smaller debris is filtered through each layer of the filter tube 220.

Figure 5A:
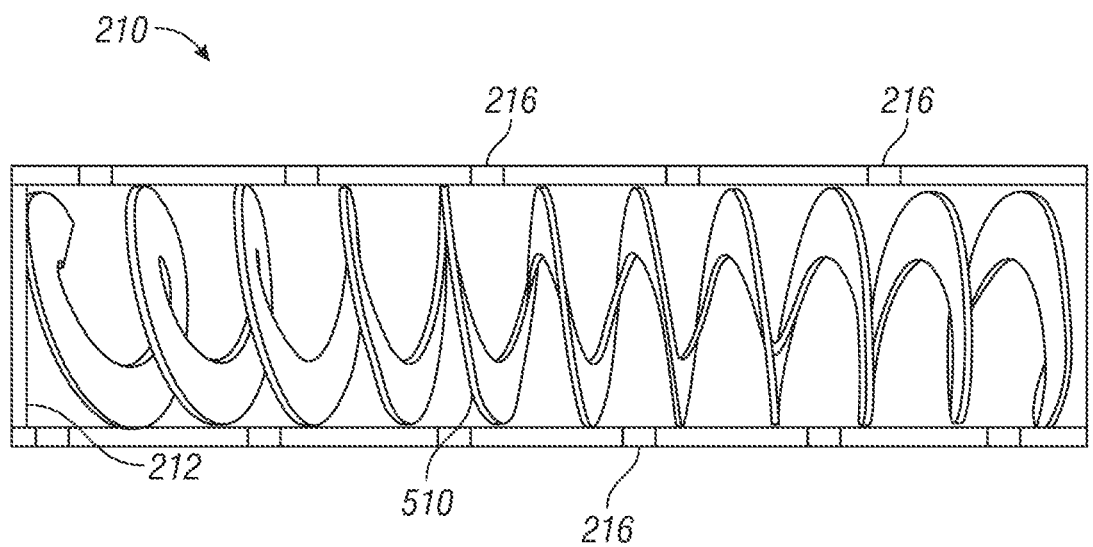
FIG. 5A is a side view of a helical flighting within an inlet tube, according to an example of the present disclosure.
Figure 5B:
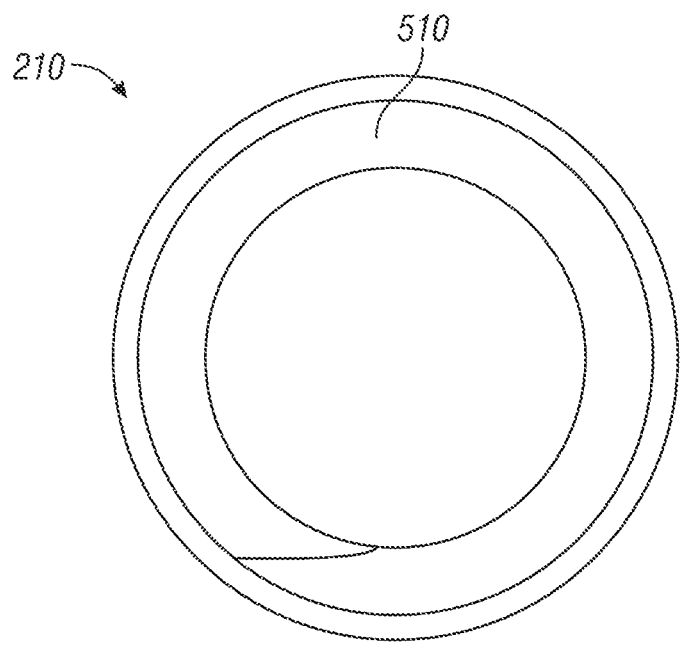
FIG. 5B is a front view of the helical flighting within the inlet tube of FIG. 5A, according to an example of the present disclosure.

Turning now to FIGS. 5A and 5B, FIG. 5A illustrates a side view of a helical flighting 510 of an example inlet tube 210. FIG. 5B illustrates a front view of the helical flighting 510 within an inlet tube 210. For example, FIG. 5B may be the front view of the helical flighting 510 and inlet tube 210 of FIG. 5A. As illustrated in the figures, the helical flighting 510 may be one or more blades, protrusions, flights, fins, or the like arranged in a helical pattern along the inside of the inlet tube 210, such as along an inner surface or inner wall of the inlet tube 210. In an example similar to that illustrated in FIG. 5A, the helical flighting 510 is helical winding, with a rectangular cross-section, which spans the length of the inlet tube 210. It should be appreciated that the helical flighting 510 may be a different design, shape, or geometry and may be non-helical. For example, the flighting 510 may include any shape, geometry, or pattern that is otherwise configured to generate centrifugal forces on fluid flowing through the inlet tube 210. As noted above, the helical flighting 510 may include more than a single piece or component, even though the example illustrated in FIG. 5A is a single piece.

The helical flighting 510 is configured to impart centrifugal forces on the debris slurry 150 such that the debris slurry is directed radially outwards towards and through the exit apertures 216 as the debris slurry 150 travels axially along the inlet tube 210 towards the capped end (e.g., capped end 212 of FIG. 2A). The debris slurry 150 also travels radially outward into the SAS area 225 and across the filter membrane, filter surface or filter area formed along the outside surface of the filter tubes 220.

In the illustrated example, the helical flighting 510 spans the length of the inlet tube 210. In one or more examples, the helical flighting 510 may span one or more sections or regions of the inlet tube 210. For example, one or more designated sections of the inlet tube 210 may include a flighting 510, such as the helical flighting 510 described herein, which is configured to impart of apply a swirling motion and/or centrifugal forces to the debris slurry 150 as is travels through the inlet tube 210. By imparting centrifugal forces on the debris slurry 150, the debris slurry is advantageously directed radially outwards towards and through the exit apertures 216 as the debris slurry travels axially along the inlet tube towards the capped end 212. The debris slurry 150 also travels radially outward into the SAS area 225 and across the filter membrane formed from an outside surface of the filter tubes 220. Furthermore, the centrifugal forces, imparted on the debris by the helical flighting 510, advantageously improve efficiency (e.g., capture efficiency) of the chamber by evenly distributing the debris slurry 150 throughout the SAS area 225, thereby minimizing areas of caking on the filter tubes. By minimizing buildup of excessive filter cake, pressure buildup in the chamber may also be minimized.

Figure 6A:
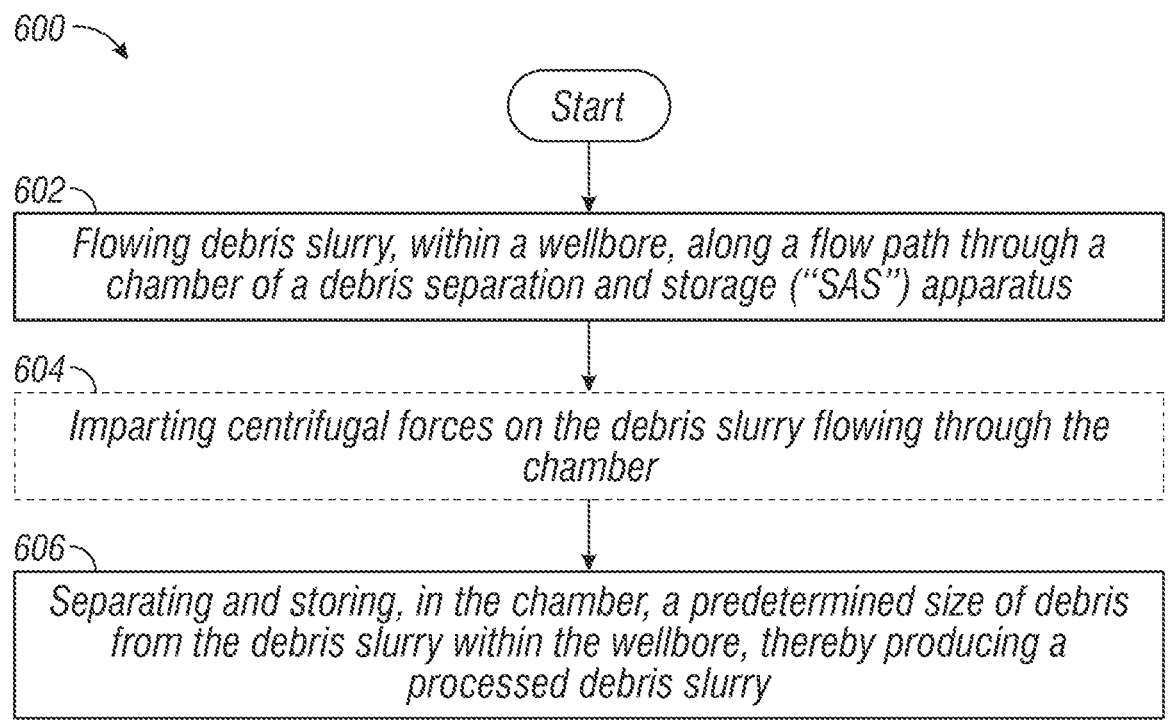
FIG. 6A is a flow chart of a method for separating and removing debris from a wellbore, according to an example of the present disclosure.

Turning now to FIG. 6A, FIG. 6A is a flow chart of a method 600 for separating and removing debris from a wellbore. In step 602, the method 600 includes flowing a debris slurry along a flow path through a chamber of a debris SAS apparatus. For example, method 600 may include flowing a debris slurry 150, within a wellbore 102, along a flow path 255 through a chamber 110 of a debris SAS apparatus 105. In an example, flowing the debris slurry 150 along the flow path 255 includes flowing the debris slurry 150 through an inlet tube 210 and radially outward through a plurality of exit apertures 216 positioned along the length of the inlet tube 210. After travelling radially outward through the exit apertures 216, the debris slurry 150 flows into a SAS area 225 outside of the inlet tube 210 and through a plurality of filter tubes 220 located within the SAS area 225. In an example, the filter tubes 220 may be oriented, arranged, sized and/or shaped as described herein as illustrated in FIGS. 2A-4D.

Optionally, in step 604, the method 600 includes imparting centrifugal forces on the debris slurry flowing through the chamber 110. For example, method 600 may include imparting centrifugal forces, by a helical flighting 510 within the inlet tube 210, to the debris slurry 150 such that the debris slurry 150 is pushed radially outwards through the exit apertures 216 into the SAS area 225 and towards the plurality of filter tubes 220.

Then, in step 606, the method 600 includes separating and storing debris (e.g., a predetermined size of debris) from the debris slurry in the chamber thereby producing a processed debris slurry. For example, method 600 may include separating and storing, in the chamber 110, a predetermined size of debris (e.g., small debris 154 and larger) from the debris slurry 150 within the wellbore 102 to produce a processed debris slurry 150'. In an example, the filter tubes 220 are configured to block flow of any debris larger than the predetermined size of debris (e.g., large debris 152, medium-sized debris 153 and/or small debris 154) from flowing into the filter tubes 220 while allowing the remaining fluid 151 from the debris slurry 150 to pass through the plurality of filter tubes 220, thereby producing the processed debris slurry 150'.

In an example, method 600 may include distributing flow of the debris slurry 150 evenly within the SAS area 225 through the exit apertures 216. In an example, the exit apertures 216 may be positioned along the inlet tube in a helical configuration, similar to that illustrated in FIGS. 3A-3C. The helical configuration may assist with creating a swirling motion of the slurry within the chamber, such that the debris slurry 150 moves radially outward and swirls within the chamber 110, thereby distributing evenly within the SAS area 225 within the chamber 110.

It should be appreciated that method 600 may include more or less steps than those illustrated in FIG. 6A. Furthermore, some of the steps illustrated in FIG. 6A may be repeated, rearranged to change their order, or otherwise modified according to the examples described herein and illustrated in FIGS. 1-6B. For example, method 600 may include flowing raw unprocessed debris slurry 150 and/or processed debris slurry 150' through one or more additional chambers (e.g., additional chamber 110 or chamber(s) 120, 130) of the debris SAS apparatus 105.

Figure 6B:
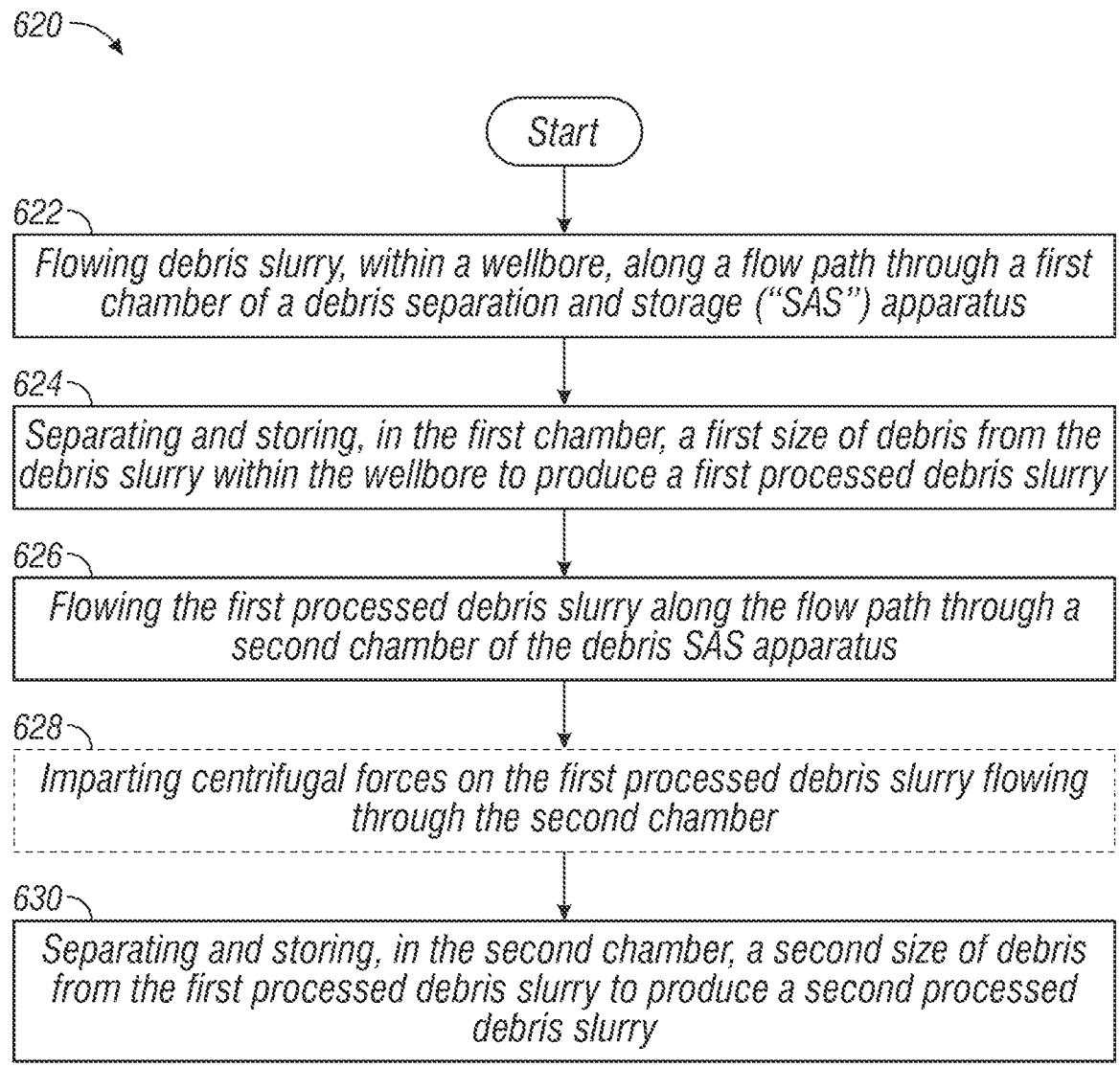
FIG. 6B is a flow chart of a method for separating and removing debris from a wellbore, according to an example of the present disclosure.

Turning now to FIG. 6B, FIG. 6B is a flow chart of a method 620 for separating and removing debris from a wellbore using an SAS apparatus 105 with at least two chambers. In step 622, the method 620 includes flowing a debris slurry along a flow path through a chamber of a debris SAS apparatus. For example, method 620 may include flowing a debris slurry 150, within a wellbore, along a flow path 255 through a first chamber 130 of a debris SAS apparatus 105.

Then, in step 624, the method 620 includes separating and storing debris (e.g., a first size of debris) from the debris slurry in the chamber to produce a processed slurry. For example, method 620 may include separating and storing, in the first chamber 130, a first size of debris (e.g., large debris 152) from the debris slurry 150 within the wellbore 102 to produce a first processed debris slurry 150'.

In step 626, the method 620 includes flowing the processed slurry along the flow path through another chamber. For example, method 620 may include flowing the first processed debris slurry 150' along the flow path 255 through a second chamber 110 of the debris SAS apparatus 105. In an example, flowing the processed debris slurry 150' along the flow path 255 includes flowing the processed debris slurry 150' through an inlet tube 210 and radially outward through a plurality of exit apertures 216 positioned along the length of the inlet tube 210. After travelling radially outward through the exit apertures 216, the processed debris slurry 150' flows into a SAS area 225 outside of the inlet tube 210 and through a plurality of filter tubes 220 located within the SAS area 225. In an example, the filter tubes 220 may be oriented, arranged, sized and/or shaped as described herein as illustrated in FIGS. 2A-4D.

Optionally, in step 628, the method 620 includes imparting centrifugal forces on the processed debris slurry flowing through the chamber. For example, method 620 may include imparting centrifugal forces, by a helical flighting 510 within the inlet tube 210, to the first processed debris slurry 150' such that the first processed debris slurry 150' is pushed radially outwards through the exit apertures 216 into the SAS area 225 and towards the plurality of filter tubes 220.

In step 630, the method 620 includes separating and storing, in the other chamber, debris (e.g., a second size of debris) from the processed debris slurry. Separating and storing debris (e.g., the size of debris) from the first processed debris slurry 150' in the chamber 110 produces a second processed debris slurry 150". For example, method 620 may include separating and storing, in the second chamber 110, a second size of debris (e.g., medium-sized debris 153 and/or small debris 154) from the first processed debris slurry 150'. In an example, the filter tubes 220 are configured to block flow of any debris larger than the second size of debris (e.g., medium-sized debris 153 and/or small debris 154) from flowing into the filter tubes 220 while allowing the remaining fluid 151 from the first processed debris slurry 150' to pass through the plurality of filter tubes 220, thereby producing a second processed debris slurry 150".

In an example, method 620 may include distributing flow of the debris slurry, such as the first processed debris slurry 150' evenly within the SAS area 225 through the exit apertures 216. In an example, the exit apertures 216 may be positioned along the inlet tube in a helical configuration, similar to that illustrated in FIGS. 3A-3C. The helical configuration may assist with creating a swirling motion of the slurry within the chamber, such that the debris slurry (e.g., first processed debris slurry) moves radially outward and swirls within the chamber, thereby distributing evenly within the SAS area 225 within the chamber.

It should be appreciated that method 620 may include more or less steps than those illustrated in FIG. 6B. Furthermore, some of the steps illustrated in FIG. 6B may be repeated, rearranged to change their order, or otherwise modified according to the examples described herein and illustrated in FIGS. 1-6B. For example, method 620 may begin at step 626 flowing raw unprocessed debris slurry 150, within a wellbore, along a flow path 255 through a chamber 110 of a debris SAS apparatus 105, similar to that illustrated in FIG. 6A. In other examples, method 620 may include passing the debris slurry 150, processed debris slurry 150' and/or any further processed debris slurries through one or more additional chambers of the debris SAS apparatus 105.

In another example, more than two chambers (e.g., chambers 130, 110) may be used for separating and removing debris from a wellbore, such as a third chamber 120. For example, prior to step 626, method 620 may include flowing the first processed debris slurry 150' along the flow path 255 through a third chamber 120. Additionally, method 620 may also include separating and storing, by the third chamber 120, a third size of debris (e.g., medium-sized debris 153) thereby removing the third size of debris from the processed debris slurry 150'. In this example, the debris slurry 150 first passes through chamber 130 where large sized debris 152 is filtered out, separated, and stored in the first chamber 130 before the processed debris slurry 150' passes through chamber 120 where medium-sized debris 153 is filtered out, separated, and stored in the second chamber 120. Then, the method 620 may continue as before, with the processed debris slurry 150' passing through chamber 110 where small-sized debris 154 is filtered out, separated, and stored in the third chamber 110. At that stage, the debris slurry has been processed three times resulting in a finally processed debris slurry 150''', which may be mostly or entirely fluid 151 free from debris 152, 153, 154.

In one or more examples, method(s) 600 and or 620 may include removing the debris SAS apparatus 105 from the wellbore 102. Method 600 may also include flushing the separated and stored debris (e.g., small-sized debris 154, medium-sized debris 153, and large-sized debris 152) from a chamber (e.g., chamber 110). Method 620 may include flushing any of the separated and stored debris, such as the large-sized debris 152 from chamber 130, medium-sized debris 153 from chamber 120, and/or small-sized debris 154 from chamber 110.

Examples of the above aspects include:

Example 1 is a debris separation and storage ("SAS") apparatus for removing debris from a wellbore comprising a chamber comprising a housing, an inlet tube located within the housing and comprising a plurality of exit apertures positioned along the length of the inlet tube and configured to allow flow of a debris slurry, within the wellbore, from the inlet tube into an SAS area outside of the inlet tube, and a plurality of filter tubes located within the SAS area and oriented parallel to and radially outward from the inlet tube, wherein the filter tubes are configured to block debris larger than a predetermined size of debris from flowing into the filter tubes while allowing the remaining fluid from the debris slurry to pass through the plurality of filter tubes and then out of the chamber, thereby producing a processed debris slurry.

Example 2 includes all the previous examples wherein the plurality of filter tubes includes at least three filter tubes, and wherein the filter tubes are formed from at least one of a screen, a wire mesh, a slotted filter, and a porous material.

Example 3 includes all the previous examples further comprising a flow path extending from an inlet of the chamber, through the inlet tube and radially outward from the plurality of exit apertures to the SAS area, through the plurality of filter tubes positioned radially about the inlet tube, to their respective outlet portions and to an outlet of the chamber.

Example 4 includes all the previous examples further comprising a helical flighting extending along and around an inside wall of the inlet tube and configured to impart centrifugal forces on the debris slurry traveling through the inlet tube as the debris slurry exits outward from the inlet tube through the plurality of exit apertures and into the SAS area.

Example 5 includes all the previous examples wherein the plurality of exit apertures are positioned and arranged in a helical pattern along the length of the inlet tube and are configured to distribute flow, of the debris slurry travelling through the inlet tube, evenly within the SAS area.

Example 6 includes all the previous examples further comprising a first chamber configured to separate and store a first size of debris from the debris slurry within the wellbore, wherein the chamber is a second chamber and the first chamber is positioned upstream of the second chamber such that the first chamber produces the produced debris slurry and the second chamber produces a second processed debris slurry.

Example 7 includes all the previous examples wherein the first size of debris is larger than the predetermined size of debris.

Example 8 includes all the previous examples further comprising a chamber attachment area on at least one end of the housing, wherein the chamber attachment area is configured to receive and couple with a corresponding chamber attachment area of the first chamber.

Example 9 includes all the previous examples further comprising a third chamber positioned between the first chamber and the second chamber, the third chamber configured to separate and store a third size of debris, the third size of debris being smaller than the first size of debris and larger than the predetermined size of debris.

Example 10 is a method of separating and removing debris from a wellbore comprising: flowing a debris slurry, within a wellbore, along a flow path through a chamber of a debris SAS apparatus, including flowing the debris slurry through an inlet tube and radially outward through a plurality of exit apertures positioned along the length of the inlet tube to a SAS area outside of the inlet tube, and through a plurality of filter tubes located within the SAS area; and separating and storing, in the chamber, a predetermined size of debris from the debris slurry within the wellbore, wherein the filter tubes are configured to block flow of debris larger than the predetermined size of debris from flowing into the filter tubes while allowing the remaining fluid from the debris slurry to pass through the plurality of filter tubes, thereby producing a processed debris slurry.

Example 11 includes all the previous examples further comprising imparting centrifugal forces, by a helical flighting within the inlet tube, to a first processed debris slurry such that first processed debris slurry is pushed radially outwards through the exit apertures into the SAS area and towards the plurality of filter tubes.

Example 12 includes all the previous examples further comprising distributing flow of the first processed debris slurry evenly within the SAS area through the exit apertures, which are positioned along the inlet tube in a helical configuration.

Example 13 includes all the previous examples further comprising:
   prior to flowing the debris slurry along the flow path through the chamber, flowing the debris slurry along the flow path through a first chamber of the debris SAS apparatus, wherein the chamber is a second chamber; and separating and storing, in the first chamber, a first size of debris from the debris slurry within the wellbore to produce a first processed debris slurry, wherein the first size of debris is larger than the predetermined size of debris.

Example 14 includes all the previous examples further comprising prior to flowing the first processed debris slurry along the flow path through the second chamber, flowing the first processed debris slurry along the flow path through a third chamber; and separating and storing, by the third chamber, a third size of debris thereby removing the third size of debris from the first processed debris slurry, thereby producing a second processed debris slurry.

Example 15 includes all the previous examples further comprising removing the debris SAS apparatus from the wellbore; flushing the separated and stored first size of debris from the first chamber; and flushing the separated and stored predetermined size of debris from the second chamber.

Example 16 is a debris separation and storage ("SAS") chamber for use with a SAS apparatus for removing debris from a wellbore, comprising: a housing; an inlet tube located within the housing and comprising a plurality of exit apertures positioned along the length of the inlet tube and configured to allow flow of a debris slurry from the inlet tube into an SAS area outside of the inlet tube; and a plurality of filter tubes located within the SAS area and oriented parallel to and radially outward from the inlet tube, wherein the filter tubes are configured to block debris larger than a predetermined size from flowing into the filter tubes while allowing the remaining fluid from the debris slurry to pass through the plurality of filter tubes to an outlet of the SAS chamber, thereby producing a processed debris slurry.

Example 17 includes all the previous examples wherein the inlet tube further comprises a helical flighting positioned within the inlet tube.

Example 18 includes all the previous examples wherein the plurality of filter tubes includes at least three filter tubes each comprising an outlet portion in fluid communication with the outlet, and wherein a combined cross-sectional area of the plurality of filter tubes is greater than a cross-sectional area of the inlet tube.

Example 19 includes all the previous examples wherein the exit apertures are positioned along the length of the inlet tube in a helical orientation.

Example 20 includes all the previous examples wherein the filter tubes are formed from at least one of a screen, a wire mesh, a slotted filter, and a porous material.

Certain terms are used throughout the description and claims to refer to particular features or components. As one skilled in the art will appreciate, different persons may refer to the same feature or component by different names. This document does not intend to distinguish between components or features that differ in name but not function.

While descriptions herein may relate to "comprising" various components or steps, the descriptions can also "consist essentially of" or "consist of" the various components and steps.

Unless otherwise indicated, all numbers expressing quantities are to be understood as being modified in all instances by the term "about" or "approximately". Accordingly, unless indicated to the contrary, the numerical parameters are approximations that may vary depending upon the desired properties of the present disclosure. As used herein, "about", "approximately", "substantially", and "significantly" will be understood by persons of ordinary skill in the art and will vary to some extent on the context in which they are used. If there are uses of the term which are not clear to persons of ordinary skill in the art given the context in which it is used, "about" and "approximately" will mean plus or minus 10% of the particular term and "substantially" and "significantly" will mean plus or minus 5% of the particular term.

The aspects disclosed should not be interpreted, or otherwise used, as limiting the scope of the disclosure, including the claims. It is to be fully recognized that the different teachings of the aspects discussed may be employed separately or in any suitable combination to produce desired results. In addition, one skilled in the art will understand that the description has broad application, and the discussion of any aspect is meant only to be exemplary of that aspect, and not intended to suggest that the scope of the disclosure, including the claims, is limited to that aspect.

What is claimed is:

1. A debris separation and storage ("SAS") apparatus for removing debris from a wellbore comprising:
a chamber comprising:
a housing,
an inlet tube located within and extending parallel to a longitudinal axis of the housing and comprising a plurality of exit apertures positioned longitudinally along a length of the inlet tube and configured to allow flow of a debris slurry, within the wellbore, from the inlet tube into an SAS area outside of the inlet tube, and
a plurality of filter tubes located within the housing, wherein each filter tube of the plurality of filter tubes are oriented longitudinally parallel to the inlet tube, wherein each filter tube of the plurality of filter tubes are located radially offset and radially outward from the inlet tube, wherein each filter tube of the plurality of filter tubes are circumferentially spaced radially outside and around the inlet tube, wherein the filter tubes are configured to block debris larger than a predetermined size of debris from flowing into the filter tubes while allowing the remaining fluid from the debris slurry to pass through the plurality of filter tubes and then out of the chamber, thereby producing a processed debris slurry.

2. The debris SAS apparatus of claim 1, wherein the plurality of filter tubes includes at least three filter tubes, and wherein the filter tubes are formed from at least one of a screen, a wire mesh, a slotted filter, and a porous material.

3. The debris SAS apparatus of claim 1, further comprising a flow path extending from an inlet of the chamber, through the inlet tube and radially outward from the plurality of exit apertures to the SAS area, through the plurality of filter tubes positioned radially about the inlet tube, to their respective outlet portions and to an outlet of the chamber.

4. The debris SAS apparatus of claim 3, further comprising a helical flighting extending along and around an inside wall of the inlet tube and configured to impart centrifugal forces on the debris slurry traveling through the inlet tube as the debris slurry exits outward from the inlet tube through the plurality of exit apertures and into the SAS area.

5. The debris SAS apparatus of claim 1, wherein the plurality of exit apertures are positioned and arranged in a helical pattern along the length of the inlet tube and are configured to distribute flow, of the debris slurry travelling through the inlet tube, evenly within the SAS area.

6. The debris SAS apparatus of claim 1, further comprising a first chamber configured to separate and store a first size of debris from the debris slurry within the wellbore, wherein the chamber is a second chamber and the first chamber is positioned upstream of the second chamber such that the first chamber produces the produced debris slurry and the second chamber produces a second processed debris slurry.

7. The debris SAS apparatus of claim 6, wherein the first size of debris is larger than a second predetermined size of debris allowed in the second chamber.

8. The debris SAS apparatus of claim 6, further comprising a chamber attachment area on at least one end of the housing, wherein the chamber attachment area is configured to receive and couple with a corresponding chamber attachment area of the first chamber.

9. The debris SAS apparatus of claim 6, further comprising a third chamber positioned between the first chamber and the second chamber, the third chamber configured to separate and store a third size of debris, the third size of debris being smaller than the first size of debris and larger than a second predetermined size of debris allowed in the second chamber.

10. A method of separating and removing debris from a wellbore comprising:
flowing a debris slurry, within the wellbore, along a flow path through a chamber of a debris separation and storage ("SAS") apparatus comprising a housing, including flowing the debris slurry through an inlet tube located within and extending parallel to a longitudinal axis of the housing, and subsequently flowing the debris slurry radially outward through a plurality of exit apertures positioned longitudinally along a length of the inlet tube to a SAS area outside of the inlet tube, and through a plurality of filter tubes located within the housing, wherein each filter tube of the plurality of filter tubes are oriented longitudinally parallel to the inlet tube, wherein each filter tube of the plurality of filter tubes are located radially offset and radially outward from the inlet tube, wherein each filter tube of the plurality of filter tubes are circumferentially spaced radially outside and around the inlet tube; and
separating and storing, in the chamber, a predetermined size of debris from the debris slurry within the wellbore, wherein the filter tubes are configured to block flow of debris larger than the predetermined size of debris from flowing into the filter tubes while allowing the remaining fluid from the debris slurry to pass through the plurality of filter tubes, thereby producing a processed debris slurry.

11. The method of claim 10, further comprising imparting centrifugal forces, by a helical flighting within the inlet tube, to a first processed debris slurry such that first processed debris slurry is pushed radially outwards through the exit apertures into the SAS area and towards the plurality of filter tubes.

12. The method of claim 10, further comprising distributing flow of the first processed debris slurry evenly within the SAS area through the exit apertures, which are positioned along the inlet tube in a helical configuration.

13. The method of claim 10, further comprising:
prior to flowing the debris slurry along the flow path through the chamber, flowing the debris slurry along the flow path through a first chamber of the debris SAS apparatus, wherein the chamber is a second chamber; and
separating and storing, in the first chamber, a first size of debris from the debris slurry within the wellbore to produce a first processed debris slurry, wherein the first size of debris is larger than a second predetermined size of debris allowed in the second chamber.

14. The method of claim 13, further comprising:
prior to flowing the first processed debris slurry along the flow path through the second chamber, flowing the first processed debris slurry along the flow path through a third chamber; and
separating and storing, by the third chamber, a third size of debris thereby removing the third size of debris from the first processed debris slurry, thereby producing a second processed debris slurry.

15. The method of claim 13, further comprising:
removing the debris SAS apparatus from the wellbore;
flushing the separated and stored first size of debris from the first chamber; and
flushing the separated and stored predetermined size of debris from the second chamber.

16. A debris separation and storage ("SAS") chamber for use with a SAS apparatus for removing debris from a wellbore, comprising:
a housing;
an inlet tube located within and extending parallel to a longitudinal axis of the housing and comprising a plurality of exit apertures positioned longitudinally along a length of the inlet tube and configured to allow flow of a debris slurry from the inlet tube into an SAS area outside of the inlet tube; and
a plurality of filter tubes located within the housing, wherein each filter tube of the plurality of filter tubes are oriented longitudinally parallel to the inlet tube, wherein each filter tube of the plurality of filter tubes are located radially offset and radially outward from the inlet tube, wherein each filter tube of the plurality of filter tubes are circumferentially spaced radially outside and around the inlet tube, wherein the filter tubes are configured to block debris larger than a predetermined size from flowing into the filter tubes while allowing the remaining fluid from the debris slurry to pass through the plurality of filter tubes to an outlet of the SAS chamber, thereby producing a processed debris slurry.

17. The debris SAS chamber of claim 16, wherein the inlet tube further comprises a helical flighting positioned within the inlet tube.

18. The debris SAS chamber of claim 16, wherein the plurality of filter tubes includes at least three filter tubes each comprising an outlet portion in fluid communication with the outlet, and wherein a combined cross-sectional area of the plurality of filter tubes is greater than a cross-sectional area of the inlet tube.

19. The debris SAS chamber of claim 16, wherein the exit apertures are positioned along the length of the inlet tube in a helical orientation.

20. The debris SAS chamber of claim 16, wherein the filter tubes are formed from at least one of a screen, a wire mesh, a slotted filter, and a porous material.

* * * * *